United States Patent
Okui et al.

(10) Patent No.: US 11,299,618 B2
(45) Date of Patent: Apr. 12, 2022

(54) POLYACETAL RESIN COMPOSITION AND ARTICLE MOLDED THEREFROM

(71) Applicants: MITSUBISHI GAS CHEMICAL COMPANY, INC., Tokyo (JP); THAI POLYACETAL CO., LTD., Bangkok (TH)

(72) Inventors: Yumi Okui, Kanagawa (JP); Daisuke Kobayashi, Rayong (TH); Akira Ito, Tokyo (JP); Daisuke Sunaga, Mie (JP); Yupin Pattamamongkolchai, Rayong (TH); Sanit Palaharn, Rayong (TH)

(73) Assignees: MITSUBISHI GAS CHEMICAL COMPANY, INC., Tokyo (JP); THAI POLYACETAL CO., LTD., Bangkok (TH)

( * ) Notice: Subject to any disclaimer, the term of this patent is extended or adjusted under 35 U.S.C. 154(b) by 452 days.

(21) Appl. No.: 15/531,568

(22) PCT Filed: Dec. 15, 2015

(86) PCT No.: PCT/JP2015/085083
§ 371 (c)(1),
(2) Date: May 30, 2017

(87) PCT Pub. No.: WO2016/104255
PCT Pub. Date: Jun. 30, 2016

(65) Prior Publication Data
US 2017/0327682 A1   Nov. 16, 2017

(30) Foreign Application Priority Data

Dec. 22, 2014 (JP) .............................. JP2014-259206

(51) Int. Cl.
| | | |
|---|---|---|
| *C08L 59/04* | (2006.01) | |
| *C08K 3/22* | (2006.01) | |
| *C08K 5/17* | (2006.01) | |
| *C08K 5/3435* | (2006.01) | |
| *C08L 77/00* | (2006.01) | |

(52) U.S. Cl.
CPC ................ *C08L 59/04* (2013.01); *C08K 3/22* (2013.01); *C08K 5/17* (2013.01); *C08K 5/3435* (2013.01); *C08L 77/00* (2013.01); *C08K 2003/2296* (2013.01); *C08L 2201/08* (2013.01)

(58) Field of Classification Search
None
See application file for complete search history.

(56) References Cited

U.S. PATENT DOCUMENTS

| | | | | |
|---|---|---|---|---|
| 6,214,940 | B1 * | 4/2001 | Imashiro .............. | C08G 18/025 |
| | | | | 524/195 |
| 6,489,388 | B1 * | 12/2002 | Kurz ...................... | C08L 59/00 |
| | | | | 524/432 |
| 7,247,665 | B1 * | 7/2007 | Woerner ................. | C08K 3/22 |
| | | | | 524/100 |
| 2005/0131124 | A1 | 6/2005 | Philippoz et al. | |
| 2006/0111473 | A1 | 5/2006 | Yuan et al. | |
| 2011/0230602 | A1 * | 9/2011 | Nagai ..................... | C08L 59/02 |
| | | | | 524/88 |

FOREIGN PATENT DOCUMENTS

| | | | |
|---|---|---|---|
| JP | 7-150004 | | 6/1995 |
| JP | 8-100102 | | 4/1996 |
| JP | 11035787 A | * | 2/1999 |
| JP | 2001-11284 | | 1/2001 |
| JP | 2003-509521 | | 3/2003 |
| JP | 2007-534787 | | 11/2007 |
| JP | 2008-520816 | | 6/2008 |
| WO | 2004/058887 A1 | | 7/2004 |

OTHER PUBLICATIONS

Lanxess, "Product Data Sheet: Zinkoxyd aktiv," pp. 1-2 (2006). (Year: 2006).*
Sigma-Aldrich, "Zinc oxide, nanopower, < 100 nm particle size," at https://www.sigmaaldrich.com/catalog/product/aldrich/544906?lang=en&region=US#, (2020) (Year: 2020).*
European Search Report issued with respect to Application No. 15872824.6, dated Jul. 11, 2018.
A Grigalovica et al., "Thermal stability of polyacetal/ethylene-octene copolymer/zinc oxide nanocomposites", IOP Conference Series: Materials Science and Engineering, vol. 49, (Dec. 13, 2013).
International Search Report issued in Patent Application No. PCT/JP2015/085083, dated Mar. 1, 2016.
Office Action in CN 201580067883.0 dated Jul. 31, 2019 (with English translation).
Wacharawichanant et al., Effect of particle sizes of zinc oxide on mechanical, thermal and morphological properties of polyoxymethylene/zinc oxide nanocomposites, *Polymer Testing*, 27 (2008) 971-976.

* cited by examiner

*Primary Examiner* — Randy P Gulakowski
*Assistant Examiner* — Ha S Nguyen
(74) *Attorney, Agent, or Firm* — Greenblum & Bernstein, P.L.C.

(57) ABSTRACT

The present invention provides a polyacetal resin composition comprising (A) a polyacetal resin and (B) zinc oxide, wherein the content of oxyalkylene constituent units other than an oxymethylene group in the polyacetal resin (A) is 0.1% by mass or more, and wherein the total surface area of the zinc oxide (B) in the polyacetal resin composition is 0.1 to 40 m² per 100 g of the polyacetal resin (A); as well as an article molded therefrom.

5 Claims, No Drawings

POLYACETAL RESIN COMPOSITION AND ARTICLE MOLDED THEREFROM

FIELD OF THE INVENTION

The present invention relates to a polyacetal resin composition comprising zinc oxide and an article molded therefrom.

BACKGROUND ART

A polyacetal resin has excellent balance between, for example, the mechanical properties, thermal properties, electric properties, sliding properties, and moldability, and is widely used as, for example, structural materials and mechanical parts in electrical appliances, automobile parts, precision machinery parts and others. For example, with respect to automobile parts, the polyacetal resin is used in a part to be directly in contact with a fuel oil, such as a large-sized part for, for example, a fuel transfer unit, representatively a fuel pump module. However, when used in automobile application-related parts to be in contact with a diesel fuel which is used in an environment at high temperatures, the improvement of the polyacetal resin in heat resistance as well as fuel resistance (particularly, acid resistance) is important. For improving the heat resistance and fuel resistance, the addition of an amino-substituted triazine compound, a hindered amine compound, or a hydroxide, oxide, alkoxide, fatty acid salt, or inorganic acid salt of an alkali metal or alkaline earth metal to the polyacetal resin has been performed, but a further improvement of the heat resistance and fuel resistance has been desired.

With respect to the improvement of the acid resistance of a polyacetal resin, there have been several disclosures. For example, the addition of an antioxidant and one or more zinc-containing compounds to a polyacetal resin has been disclosed (see, for example, patent document 1). There has been disclosed a method in which zinc oxide and polyalkylene glycol are added to a polyoxymethylene homopolymer or a polyoxymethylene copolymer for improving the toughness and fuel resistance (see, for example, patent document 2). Further, there is a disclosure that polyalkylene glycol, zinc oxide, and one or two or more nitrogen-containing compounds are added in the respective specific amounts to polyoxymethylene for improving the acid resistance (see, for example, patent document 3). In addition, there is a disclosure that an antioxidant, a zinc compound having a pH of 7 or more when suspended or dissolved in pure water at a concentration of 1% by weight, and one or more organic compounds, such as tetrachloroisophthalonitrile, to a polyacetal resin to improve the chlorine resistance, and there is a disclosure that the polyacetal resin is markedly lowered in the heat stability and water resistance when adding thereto a zinc compound having a pH of less than 7 (see, for example, patent document 4). However, a further improvement of the heat resistance and fuel resistance (acid resistance) of the polyacetal resin with respect to a diesel fuel is desired.

PRIOR ART REFERENCES

Patent Documents

Patent document 1: Japanese Unexamined Patent Publication No. Hei 7-150004
Patent document 2: Japanese Unexamined Patent Publication No. 2001-011284
Patent document 3: Japanese Patent Application prior-to-examination Publication (kohyo) No. 2003-509521
Patent document 4: Japanese Unexamined Patent Publication No. Hei 8-100102

SUMMARY OF THE INVENTION

Problems to be Solved by the Invention

An object of the present invention is to provide a polyacetal resin composition having both practically satisfactory heat resistance and fuel resistance (acid resistance), and an article molded from the composition. Particularly, an object is to provide a polyacetal resin composition having excellent balance between the heat resistance and the fuel resistance with respect to a diesel fuel which is used in an environment at high temperatures, and an article molded from the composition.

Means for Solving the Problems

In view of the above-mentioned technical problems, the present inventors have conducted extensive and intensive studies on the zinc oxide added to a polyacetal resin with respect to the physical properties of the zinc oxide and the heat resistance and fuel resistance of the obtained polyacetal resin composition. As a result, it has been found that, when the total surface area of the zinc oxide used in the polyacetal resin composition is in a specific range, the resultant polyacetal resin composition can exhibit excellent balance between the heat resistance and the fuel resistance, and the present invention has been completed.

Specifically, the present invention is directed to a polyacetal resin composition comprising (A) a polyacetal resin and (B) zinc oxide, wherein the content of oxyalkylene constituent units other than an oxymethylene group in the polyacetal resin (A) is 0.1% by mass or more, and wherein the total surface area of the zinc oxide (B) in the polyacetal resin composition is 0.1 to 40 m² per 100 g of the polyacetal resin (A), and an article molded from the composition.

Effects of the Invention

The polyacetal resin composition of the present invention has excellent balance between the fuel resistance and the heat resistance. Therefore, an article molded from the polyacetal resin composition can be advantageously used as a part to be directly in contact with a fuel oil (particularly, a diesel fuel oil used at high temperatures), such as a large-sized part for, for example, a fuel transfer unit, representatively a fuel pump module.

MODE FOR CARRYING OUT THE INVENTION

<Polyacetal Resin (A)>

Polyacetal resin (A) in the present invention is a polymer having an acetal structure: —O—CRH— (wherein R represents a hydrogen atom or an organic group) in the repeating units, and is generally comprised of an oxymethylene group (—OCH$_2$—), which corresponds to the above acetal structure wherein R is a hydrogen atom, as main constituent units. Specifically, the content of the oxymethylene group in polyacetal resin (A) is 50% by mass or more, preferably 70% by mass or more, more preferably 90 to 99.5% by mass. Polyacetal resin (A) used in the present invention includes a copolymer (block copolymer) or terpolymer having one or more types of repeating constituent units other than the above-mentioned oxymethylene group, and further may have a linear structure, or a branched or cross-linked structure which is formed by using, for example, a glycidyl ether compound, an epoxy compound, or an allyl ether compound as a comonomer and/or termonomer. Examples of the constituent units other than an oxymethylene group include oxyalkylene groups having 2 to 10 carbon atoms and being optionally branched, such as an oxyethylene group (—OCH$_2$CH$_2$— or —OCH(CH$_3$)—), an oxypropylene group (—OCH$_2$CH$_2$CH$_2$—, —OCH(CH$_3$)CH$_2$—, or —OCH$_2$CH(CH$_3$)—), and an oxybutylene group (—OCH$_2$CH$_2$CH$_2$CH$_2$—, —OCH(CH$_3$)CH$_2$CH$_2$—, —OCH$_2$CH(CH$_3$)CH$_2$—, —OCH$_2$CH$_2$CH(CH$_3$)—, —OCH(C$_2$H$_5$)CH$_2$—, or —OCH$_2$CH(C$_2$H$_5$)—). Of these, preferred are oxyalkylene groups having 2 to 4 carbon atoms and being optionally branched, and especially preferred is an oxyethylene group (—OCH$_2$CH$_2$—). The content of the oxyalkylene constituent units other than an oxymethylene group in polyacetal resin (A) is preferably 0.1 to 10.0% by mass, more preferably 0.5 to 8.0% by mass.

The method for producing polyacetal resin (A) in the present invention is arbitrary, and polyacetal resin (A) may be produced by a conventionally known, arbitrary method. For example, with respect to the method for producing polyacetal resin (A) having an oxymethylene group and an oxyalkylene group having 2 to 4 carbon atoms as constituent units, the polyacetal resin can be produced by copolymerizing a cyclic acetal of an oxymethylene group, such as a trimer of formaldehyde (trioxane) or a tetramer of formaldehyde (tetraoxane), with a cyclic acetal containing an oxyalkylene group having 2 to 4 carbon atoms, such as ethylene oxide, 1,3-dioxolane, 1,3,6-trioxocane, or 1,3-dioxepane. Particularly, polyacetal resin (A) used in the present invention is preferably a copolymer of a cyclic acetal, such as trioxane or tetraoxane, and ethylene oxide or 1,3-dioxolane, especially preferably a copolymer of trioxane and 1,3-dioxolane.

For example, polyacetal resin (A) in the present invention can be obtained by a method in which a cyclic acetal of an oxymethylene group and a cyclic acetal containing an oxyalkylene group having 2 to 4 carbon atoms, which is a comonomer, are subjected to bulk polymerization using a polymerization catalyst. For a deactivation treatment of the polymerization catalyst and the end group of polymer propagation, if necessary, a reaction terminator may be used. Further, for modifying the molecular weight of polyacetal resin (A), if necessary, a molecular weight modifier may be used. With respect to the type and amount of the polymerization catalyst, reaction terminator, and molecular weight modifier which can be used in the production of polyacetal resin (A) in the present invention, there is no particular limitation as long as the effects of the present invention are not sacrificed, and a conventionally known, arbitrary polymerization catalyst, reaction terminator, and molecular weight modifier can be appropriately selected and used.

With respect to the polymerization catalyst, there is no particular limitation, but examples of polymerization catalysts include Lewis acids, such as boron trifluoride, tin tetrachloride, titanium tetrachloride, phosphorus pentachloride, phosphorus pentafluoride, arsenic pentafluoride, and antimony pentafluoride, and complex compounds and salt compounds of the above Lewis acids. Further, examples include protonic acids, such as trifluoromethanesulfonic acid and perchloric acid; protonic acid esters, such as an ester of perchloric acid and a lower aliphatic alcohol; and protonic acid anhydrides, such as a mixed acid anhydride of perchloric acid and a lower aliphatic carboxylic acid. Further examples include triethyloxonium hexafluorophosphate, triphenylmethyl hexafluoroarsenate, acetyl hexafluoroborate, heteropolyacids and acid salts thereof, isopolyacids and acid salts thereof, and perfluoroalkylsulfonic acids and acid salts thereof. Of these, preferred are compounds containing boron trifluoride, and especially preferred are boron trifluoride diethyl etherate and boron trifluoride dibutyl etherate which are complexes of boron trifluoride coordinated with ether.

With respect to the amount of the polymerization catalyst used, there is no particular limitation. The amount of the polymerization catalyst used is, relative to 1 mol of the total of the trioxane and comonomer (total of the monomers), generally in the range of from $1.0 \times 10^{-8}$ to $2.0 \times 10^{-3}$ mol, preferably $5.0 \times 10^{-8}$ to $8.0 \times 10^{-4}$ mol, especially preferably $5.0 \times 10^{-8}$ to $1.0 \times 10^{-4}$ mol.

With respect to the reaction terminator, there is no particular limitation, but examples of reaction terminators include trivalent organophosphorus compounds, amine compounds, and hydroxides of an alkali metal or alkaline earth metal. These reaction terminators can be used individually or in combination. Of these, trivalent organophosphorus compounds, tertiary amines, and hindered amines are preferred.

With respect to the amount of the reaction terminator used, there is no particular limitation as long as the amount is sufficient to deactivate the polymerization catalyst. The amount of the reaction terminator used is generally in the range of from $1.0 \times 10^{-1}$ to $1.0 \times 10^{1}$, in terms of the molar ratio of the reaction terminator to the polymerization catalyst.

With respect to the molecular weight modifier, there is no particular limitation, but examples of molecular weight modifiers include methylal, methoxymethylal, dimethoxymethylal, trimethoxymethylal, and oxymethylene di-n-butyl ether. Of these, methylal is preferred. The amount of the molecular weight modifier used is appropriately determined according to the intended molecular weight. Generally, the amount of the molecular weight modifier added is controlled to be in the range of from 0 to 0.1% by mass, based on the total mass of the monomers.

<Zinc Oxide (B)>

Zinc oxide (B) in the present invention is not limited by the method for producing the zinc oxide, but the zinc oxide is a white powder produced in accordance with the standards of JIS K 1410-95 and JIS K 8405-94. The zinc oxide is a white powder industrially produced by a dry process or a wet process. The dry process includes a French process and an American process, and zinc oxide is produced mainly by a French process. The French process is a method in which molten metallic zinc is placed in a crucible and heated to about 1,000° C., and the generated zinc vapor is oxidized by hot air, and then cooled using an air condenser, and separated and collected by means of a cyclone and a bag filter. The wet process includes two main methods, i.e., a method in which a soda ash solution is added to a zinc chloride solution to cause precipitation of basic zinc oxide, and a method in which zinc hydroxide is formed, and washed with water and dried, followed by calcination, to produce zinc oxide. In the present invention, zinc oxide produced by any of a dry process and a wet process can be used as long as the zinc oxide is added so that the total surface area of zinc oxide (B) in the polyacetal resin composition is in a specific range, and, with respect to the particle diameter and others of the zinc oxide, there is no particular limitation.

Zinc oxide (B) in the present invention is added so that the total surface area (referred to also as "BET total surface area" in the present specification) of the zinc oxide in the polyacetal resin composition becomes 0.1 to 40 [m$^2$]. Particularly, zinc oxide (B) is preferably added so that the total surface area of the zinc oxide in the polyacetal resin composition becomes 1 to 30 [m$^2$], and is especially preferably added so that the total surface area of the zinc oxide in the polyacetal resin composition becomes 1 to 20 [m$^2$]. In this case, the amount of zinc oxide (B) added is determined depending on the BET specific surface area of zinc oxide (B) used. The total surface area (BET total surface area) of the zinc oxide in the polyacetal resin composition is preferably 0.1 [m$^2$] or more from the viewpoint of improving the fuel resistance, and is preferably 40 [m$^2$] or less from the viewpoint of suppressing a lowering of the heat resistance and suppressing mold deposit (MD) generation. Especially, when the total surface area of the zinc oxide in the polyacetal resin composition is in the range of from 1 to 30 [m$^2$], a practical polyacetal resin composition having excellent balance between two elements, i.e., the heat resistance and the fuel resistance is obtained, and, particularly, when the total surface area of the zinc oxide in the polyacetal resin composition is in the range of from 1 to 20 [m$^2$], the balance between two elements, i.e., the heat resistance and the fuel resistance is further improved, so that a more practical polyacetal resin composition can be obtained.

With respect to the BET specific surface area of zinc oxide (B) added to the polyacetal resin, there is no particular limitation, and the BET specific surface area of zinc oxide (B) is appropriately selected according to the total surface area (BET total surface area) of the zinc oxide in the polyacetal resin composition and the amount of zinc oxide (B) added to the polyacetal resin. The BET specific surface area of zinc oxide (B) added may be, for example, 0.1 to 70 [m$^2$/g], preferably 0.1 to 40 [m$^2$/g], more preferably 1 to 30 [m$^2$/g]. When the BET specific surface area of zinc oxide (B) is in the range of from 0.1 to 70 [m$^2$/g], the total surface area (BET total surface area) of the zinc oxide in the polyacetal resin composition can be easily controlled to be in the range of from 0.1 to 40 [m$^2$]. Especially, when the BET specific surface area of zinc oxide (B) is in the range of from 0.1 to 40 [m$^2$/g], a practical polyacetal resin composition having excellent balance between two elements, i.e., the heat resistance and the fuel resistance is obtained, and, particularly, when the BET specific surface area of zinc oxide (B) is in the range of from 1 to 30 [m$^2$/g], the balance between two elements, i.e., the heat resistance and the fuel resistance is further improved, so that a more practical polyacetal resin composition can be obtained.

With respect to the pH of zinc oxide (B) as measured in accordance with JIS K 5101-17-1, there is no particular limitation, but the pH of zinc oxide (B) may be, for example, 6 to 10, preferably 6 to 8. When the pH of zinc oxide (B) is 6 to 10, a polyacetal resin composition having excellent balance between the heat resistance and the fuel resistance is obtained. Especially, when the pH of zinc oxide (B) is 6 to 8, a polyacetal resin composition having more excellent heat resistance and fuel resistance is obtained.

In the present invention, for further improving the polyacetal resin composition in the heat resistance, fuel resistance, and resistance to mold deposit (MD) generation, polyamide resin (C), hindered amine compound (D), and at least one compound (E) selected from the group consisting of a carbodiimide compound, an oxazoline compound, and an epoxy compound are preferably used in combination with the above-mentioned zinc oxide (B).

<Polyamide Resin (C)>

In the present invention, by adding polyamide resin (C), it is possible to further improve the polyacetal resin composition in heat resistance and fuel resistance. Polyamide resin (C) in the present invention is a resin having 2 or more amide linkages in the molecule thereof, and examples of polyamide resins (C) include nylon-6, nylon-6,6, nylon-6,10, terpolymers thereof, polymerized fatty acid polyamide resins, and polyamide elastomers. Of these, polymerized fatty acid polyamide resins and polyamide elastomers are especially preferred. These polyamide resins may be used individually or in combination.

The polymerized fatty acid polyamide resin means a polyamide resin comprised of a polycondensation product of a polymerized fatty acid and a diamine.

The polymerized fatty acid means a polymer of an unsaturated fatty acid, or a product obtained by hydrogenating the polymer, and examples of polymerized fatty acids include dimers (dimer acids) of a monobasic fatty acid having 10 to 24 carbon atoms and having at least one double bond or triple bond, and hydrogenation products thereof. Examples of dimer acids include dimers of oleic acid, linoleic acid, or erucic acid.

Examples of diamines include hexamethylenediamine, heptamethylenediamine, octamethylenediamine, decamethylenediamine, and metaxylylenediamine.

The polyamide elastomer means a polyamide resin having a hard segment and a soft segment, wherein the hard segment is comprised of a polyamide and the soft segment is comprised of a polymer other than the polyamide. Examples of polyamides constituting the hard segment include nylon-6, nylon-6,6, nylon-6,10, terpolymers thereof, and polymerized fatty acid polyamide resins. Examples of polymers other than the polyamide include aliphatic polyesters and aliphatic polyethers. Examples of aliphatic polyesters include poly(ε-caprolactone), polyethylene adipate, polybutylene adipate, and polybutylene succinate. Examples of aliphatic polyethers include polyoxyalkylene glycols, such as polyethylene oxide and polypropylene oxide.

In the addition of polyamide resin (C) to the polyacetal resin composition, the amine value and melting temperature or softening temperature of polyamide resin (C) affect the heat resistance and fuel resistance of the polyacetal resin composition. The amine value of polyamide resin (C) is not particularly limited, but is preferably 2.0 mg KOH/g or more. In this case, when the amine value of polyamide resin (C) is 2.0 mg KOH/g or more, the resultant polyacetal resin composition can be improved in the heat resistance. The amine value of polyamide resin (C) can be determined by the method described below. Specifically, 3.0 g of a polyamide resin is dissolved in 80 mL of m-cresol to prepare a solution as a titrate, and the titrate is subjected to potentiometric titration using a 0.050 mol/L methanol solution of perchloric acid as a titrant, and, from the amount of the titrant required until reaching the equivalence point, an amine value per 1.0 g of the polyamide resin can be determined, in terms of the corresponding mass of potassium hydroxide (mg KOH). The amine value of polyamide resin (C) is preferably 40 mg KOH/g or less, more preferably 30 mg KOH/g or less. When the amine value of polyamide resin (C) is 40 mg KOH/g or less, the occurrence of discoloration during the melt-kneading can be suppressed.

The melting temperature or softening temperature of polyamide resin (C) is not particularly limited, but is preferably 70 to 170° C. The melting temperature or softening temperature of polyamide resin (C) is preferably 170° C. or lower from the viewpoint of the dispersibility upon melt-kneading, and is preferably 70° C. or higher from the viewpoint of preventing the occurrence of bleeding upon molding and suppressing mold deposit (MD) generation.

The amount of polyamide resin (C) added is, relative to 100 parts by mass of polyacetal resin (A), preferably 0 to 3.0 parts by mass, more preferably 0.01 to 3.0 parts by mass, especially preferably 0.01 to 1.0 part by mass.

<Hindered Amine Compound (D)>

Examples of hindered amine compounds (D) in the present invention include N,N',N'',N'''-tetrakis-(4,6-bis-(butyl-(N-methyl-2,2,6,6-tetramethylpiperidin-4-yl)amino)-triazin-2-yl)-4,7-diazadecane-1,10-diamine, a polycondensation product of dibutylamine•1,3,5-triazine•N,N'-bis(2,2,6,6-tetramethyl-4-piperidyl)-1,6-hexamethylenediamine and N-(2,2,6,6-tetramethyl-4-piperidyl)butylamine (Chimassorb (registered trademark) 2020 FDL, manufactured by BASF AG), poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], a polycondensation product of dimethyl succinate and 4-hydroxy-2,2,6,6-tetramethyl-1-piperidineethanol (Tinuvin (registered trademark) 622, manufactured by BASF AG), bis(1,2,2,6,6-pentamethyl-4-piperidyl)[[3,5-bis(1,1-dimethylethyl)-4-hydroxyphenyl]methyl]butyl malonate, bis(2,2,6,6-tetramethyl-4-piperidyl) sebacate (Tinuvin (registered trademark) 770, manufactured by BASF AG), bis(1,2,2,6,6-pentamethyl-4-piperidyl) sebacate, and 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine. Of these, preferred are bis(2,2,6,6-tetramethyl-4-piperidyl) sebacate, bis(1,2,2,6,6-pentamethyl-4-piperidyl) sebacate, and a polycondensation product of dimethyl succinate and 4-hydroxy-2,2,6,6-tetramethyl-1-piperidineethanol. The above-mentioned hindered amine compounds may be used individually or in combination. In the present invention, the hindered amine compound is considered to trap decomposition product components formed in a diesel fuel at high temperatures (such as a carboxylic acid and a peroxide) and decomposition product components derived from the polyacetal resin (such as formaldehyde and formic acid) so as to exhibit an effect of preventing deterioration of the polyacetal resin and further an effect of improving the heat resistance.

The amount of hindered amine compound (D) added in the present invention is, relative to 100 parts by mass of polyacetal resin (A), preferably 0 to 3.0 parts by mass, more preferably 0.01 to 3.0 parts by mass, especially preferably 0.01 to 2.0 parts by mass. By adding hindered amine compound (D), it is possible to further improve the polyacetal resin composition in fuel resistance.

<Carbodiimide Compound, Oxazoline Compound, or Epoxy Compound (E)>

In the present invention, at least one compound (E) selected from the group consisting of a carbodiimide compound, an oxazoline compound, and an epoxy compound can be used in combination with zinc oxide (B). By adding the above compound, it is possible to further improve the polyacetal resin composition in fuel resistance and/or resistance to mold deposit (MD) generation.

With respect to the carbodiimide compound, there is no particular limitation as long as it has at least one carbodiimide group in the molecule thereof, and ones which are commercially available or produced by a known method can be used. Examples of such carbodiimide compounds include dicyclohexylcarbodiimide, diisopropylcarbodiimide, dimethylcarbodiimide, diisobutylcarbodiimide, dioctylcarbodiimide, t-butylisopropylcarbodiimide, diphenylcarbodiimide, di-t-butylcarbodiimide, di-β-naphthylcarbodiimide, N,N'-di-2,6-diisopropylphenylcarbodiimide, 2,6,2',6'-tetraisopropyldiphenylcarbodiimide, cyclic carbodiimides, and polycarbodiimides, such as Carbodilite (registered trademark; manufactured by Nisshinbo Chemical Inc.) and Stabaxol (registered trademark; manufactured by Rhein Chemie).

With respect to the oxazoline compound, there is no particular limitation, and examples of oxazoline compounds include vinyloxazolines, such as 2-vinyl-2-oxazoline, 5-methyl-2-vinyl-2-oxazoline, 4,4-dimethyl-2-vinyl-2-oxazoline, 2-isopropenyl-2-oxazoline, styrene•2-isopropenyl-2-oxazoline, and 4,4-dimethyl-2-isopropenyl-2-oxazoline; and bisoxazoline compounds, such as 1,3-phenylenebis(2-oxazoline), 1,4-phenylenebis(2-oxazoline), 2,2-bis(2-oxazoline), 2,2-bis(4-methyl-2-oxazoline), 2,2-bis(4,4-dimethyl-2-oxazoline), 2,2-bis(4-ethyl-2-oxazoline), 2,2-bis(4,4-diethyl-2-oxazoline), 2,2-bis(4-propyl-2-oxazoline), 2,2-bis(4-butyl-2-oxazoline), 2,2-bis(4-hexyl-2-oxazoline), 2,2-bis(4-phenyl-2-oxazoline), 2,2-bis(4-cyclohexyl-2-oxazoline), 2,2-bis(4-benzyl-2-oxazoline), 2,2-ethylenebis(2-oxazoline), 2,2-tetramethylenebis(2-oxazoline), 2,2-hexamethylenebis(2-oxazoline), 2,2-octamethylenebis(2-oxazoline), 2,2-ethylenebis(4-ethyl-2-oxazoline), 2,2-tetraethylenebis(4-ethyl-2-oxazoline), and 2,2-cyclohexylenebis(4-ethyl-2-oxazoline), and preferred examples include styrene•2-isopropenyl-2-oxazoline, 2-isopropenyl-2-oxazoline, 1,3-phenylenebis(2-oxazoline), and oxazoline group-containing polymers, such as EPOCROS (registered trademark; manufactured by Nippon Shokubai Co., Ltd.).

With respect to the epoxy compound, there is no particular limitation, but, for example, a glycidyl ether compound, a glycidyl ester compound, a glycidyl amine compound, a glycidyl imide compound, or an alicyclic epoxy compound can be used, and preferred is an epoxy group-containing acrylic polymer, such as BLEMMER (registered trademark; manufactured by NOF Corporation) or MARPROOF (registered trademark; manufactured by NOF Corporation) having a glycidyl group. Further, a glycidyl ether compound and a glycidyl ester compound are preferred. Especially, ethylene glycol diglycidyl ether, propylene glycol diglycidyl ether, neopentyl glycol diglycidyl ether, triethylolpropane polyglycidyl ether, glycerol diglycidyl ether, glycerol triglycidyl ether, sorbitol polyglycidyl ether, bisphenol A diglycidyl ether, hydrogenated bisphenol A glycidyl ether, 4,4'-diphenylmethane diglycidyl ether, diglycidyl terephthalate, diglycidyl isophthalate, and EPIOL (registered trademark; manufactured by NOF Corporation) are preferred.

The amount (total amount) of at least one compound (E) selected from the group consisting of a carbodiimide compound, an oxazoline compound, and an epoxy compound added in the present invention is, relative to 100 parts by mass of polyacetal resin (A), preferably 0 to 3.0 parts by mass, more preferably 0.01 to 3.0 parts by mass, especially preferably 0.01 to 2.0 parts by mass.

<Other Components>

Further, when practicing the present invention, a hindered phenol compound, an amino-substituted triazine compound, a phosphorus stabilizer, or a hydroxide, oxide, alkoxide, fatty acid salt, or inorganic acid salt of an alkali metal or alkaline earth metal can be added to the polyacetal resin composition of the present invention in such an amount that the effects aimed at by the present invention are not sacrificed.

With respect to the type of the hindered phenol compound, there is no particular limitation, but examples of hindered phenol compounds include 1,6-hexanediol-bis-[3-(3,5-di-t-butyl-4-hydroxyphenyl) propionate], pentaerythrityl-tetrakis[3-(3,5-di-t-butyl-4-hydroxyphenyl) propionate], triethylene glycol-bis[3-(3-t-butyl-5-methyl-4-hydroxyphenyl) propionate], triethylene glycol-bis[3-(3,5-di-t-butyl-4-hydroxyphenyl) propionate], and 2,2'-thiodiethyl-bis-[3-(3,5-di-t-butyl-4-hydroxyphenyl) propionate]. These hindered phenol compounds may be used individually or in combination. These hindered phenol compounds are used as an antioxidant.

With respect to the amount of the hindered phenol compound added, there is no particular limitation. The amount of the hindered phenol compound added is, relative to 100 parts by mass of polyacetal resin (A), preferably 0.01 to 5.0 parts by mass, more preferably 0.01 to 2.0 parts by mass.

Examples of the amino-substituted triazine compounds include methylolmelamines, such as guanamine, melamine, N-butylmelamine, N-phenylmelamine, N,N-diphenylmelamine, N,N-diallylmelamine, N,N',N"-triphenylmelamine, and N,N',N"-trimethylolmelamine; alkylated melamines, such as hexamethoxymethylmelamine; and benzoguanamine, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, and amelin (N,N,N',N'-tetracyanoethylbenzoguanamine). Of these, preferred are melamine, methylolmelamine, an alkylated melamine, benzoguanamine, and a water-soluble melamine-formaldehyde resin. These amino-substituted triazine compounds are used as a heat stabilizer.

With respect to the amount of the amino-substituted triazine compound added, there is no particular limitation. The amount of the amino-substituted triazine compound added is, relative to 100 parts by mass of polyacetal resin (A), preferably 0.01 to 5.0 parts by mass, more preferably 0.01 to 3.0 parts by mass, especially preferably 0.015 to 2.0 parts by mass.

With respect to the type of the phosphorus stabilizer, there is no particular limitation. Examples of the phosphorus stabilizers include phosphine compounds, such as triphenylphosphine, and phosphite compounds, such as tris(2,4-di-t-butylphenyl) phosphite and bis(2,6-di-t-butyl-4-methylphenyl)pentaerythritol diphosphite. These phosphorus stabilizers may be used individually or in combination. These phosphorus stabilizers are used as an antioxidant.

With respect to the amount of the phosphorus stabilizer added, there is no particular limitation. The amount of the phosphorus stabilizer added is, relative to 100 parts by mass of polyacetal resin (A), preferably 0.01 to 5.0 parts by mass, more preferably 0.01 to 2.0 parts by mass.

With respect to the hydroxide, oxide, alkoxide, fatty acid salt, or inorganic acid salt of an alkali metal or alkaline earth metal, there is no particular limitation, but examples of them include hydroxides, oxides, fatty acid salts, methoxides, ethoxides, phosphates, silicates, and borates of calcium or magnesium. Of these, calcium hydroxide and magnesium hydroxide are preferred. These hydroxides, oxides, alkoxides, fatty acid salts, and inorganic acid salts of an alkali metal or alkaline earth metal are used as a heat stabilizer.

With respect to the amount of the added hydroxide, oxide, alkoxide, fatty acid salt, or inorganic acid salt of an alkali metal or alkaline earth metal, there is no particular limitation. The amount of the above compound added is, relative to 100 parts by mass of polyacetal resin (A), preferably 0.001 to 5.0 parts by mass, more preferably 0.005 to 3.0 parts by mass, especially preferably 0.01 to 2.0 parts by mass.

Further, when practicing the present invention, in addition to the above-mentioned components, if necessary, an additive, such as another stabilizer, a nucleating agent, a release agent, a filler, a pigment, a lubricant, a plasticizer, an antistatic agent, an ultraviolet light absorber, a flame retardant, or an auxiliary for flame retardant, another resin, or an elastomer may be appropriately added to the polyacetal resin composition of the present invention in such an amount that the effects aimed at by the present invention are not sacrificed. Examples of fillers include mineral fillers and glass fibers, such as glass fibers, glass flakes, glass beads, wollastonite, mica, talc, boron nitride, calcium carbonate, kaolin, silicon dioxide, clay, asbestos, silica, diatomaceous earth, graphite, and molybdenum disulfide; inorganic fibers, such as middle fibers, potassium titanate fibers, and boron fibers; carbon fibers; organic fibers, such as aramid fibers; potassium titanate whiskers; and further carbon black and pigments.

<Method for Producing the Polyacetal Resin Composition>

With respect to the method for producing the polyacetal resin composition of the present invention, there is no particular limitation, and the polyacetal resin composition can be produced by mixing the above-mentioned polyacetal resin (A), zinc oxide (B), and other components added if necessary in an arbitrary order, and kneading the resultant mixture. Conditions for the mixing and kneading, such as a temperature and a pressure, may be appropriately selected according to a conventionally known method for producing a polyacetal resin composition. For example, kneading may be performed at the melting temperature of polyacetal resin (A) or higher, and generally, is preferably performed at 180 to 260° C. With respect to the apparatus for producing the polyacetal resin composition, there is no particular limitation, and, for example, a mixing or kneading apparatus conventionally used in producing a resin composition of this type can be used.

Specifically, for example, zinc oxide (B), polyamide resin (C), hindered amine compound (D), at least one compound (E) selected from the group consisting of a carbodiimide compound, an oxazoline compound, and an epoxy compound, a hindered phenol compound, and an amino-substituted triazine compound in their respective predetermined amounts are added at the same time or successively in an arbitrary order to polyacetal resin (A), and, if desired, for example, another additive is further added to the resultant mixture, and then mixed using, e.g., a tumbler-type blender. Then, the resultant mixture is melt-kneaded using a single-screw or twin-screw extruder and extruded into a strand form, followed by pelletization, to obtain a polyacetal resin composition having a desired formulation.

There is an alternative method as described below. A hindered phenol compound and an amino-substituted triazine compound are added to and mixed into polyacetal resin (A), and then the resultant mixture is melt-kneaded and subjected to pelletization. To the resultant pellets are added zinc oxide (B), polyamide resin (C), hindered amine compound (D), and at least one compound (E) selected from the group consisting of a carbodiimide compound, an oxazoline compound, and an epoxy compound in their respective predetermined amounts, and, if desired, for example, another additive is further added to the resultant mixture, and then further mixed and melt-kneaded, followed by pelletization, to obtain a polyacetal resin composition having a desired formulation. Alternatively, without forming pellets, the resin composition melt-kneaded by means of an extruder can be directly molded into, for example, an injection molded article, a blow molded article, or an extruded article.

The polyacetal resin composition of the present invention can be molded in accordance with a known molding method for a polyacetal resin. With respect to the article molded from the polyacetal resin composition of the present invention, examples of forms include pellets, a round rod, a thick plate, a sheet, a tube, and a cylindrical or rectangular container, but the form of the article is not limited to these. The molded article of the present invention can be used in various parts for machines, electric appliances, automobiles, building materials and others, which have been conventionally known as the applications in which a polyacetal resin composition is used. Particularly, the molded article of the present invention has excellent heat resistance and excellent fuel resistance, and hence is advantageously used as a part to be in contact with a diesel fuel, such as a large-sized part for, for example, a fuel transfer unit, representatively a fuel pump module.

EXAMPLES

Hereinbelow, the present invention as well as embodiments and effects thereof will be described in more detail with reference to the following Examples and Comparative Examples, which should not be construed as limiting the scope of the present invention.

<Weight Loss on Heating>

The resin compositions obtained in the Examples and Comparative Examples were individually placed in a test tube, and the test tube was purged with nitrogen gas and then heated under a reduced pressure of 10 Torr at 240° C. for one hour to determine a weight loss. The smaller the weight loss, the less likely the polyacetal suffers decomposition, or the higher the heat resistance.

<Weight Loss after Immersed in a Fuel>

Using each of the resin compositions obtained in the Examples and Comparative Examples, a small-sized test specimen (length: 62 mm; width: 4 mm; thickness: 1 mm) was prepared by injection molding. The obtained specimen was subjected to test in which it was immersed in a diesel fuel (RF-90-A-92, manufactured by Haltermann) and heated at 90° C. for 672 hours. After a lapse of 672 hours, the specimen was removed from the fuel to determine a weight loss. The smaller the weight loss, the higher the fuel resistance.

<Resistance to Mold Deposit (MD) Generation>

Using a screw propeller-type injection molding machine (Minimat, manufactured by Sumitomo Heavy Industries, Ltd.) and a teardrop-shaped mold, 4,000-shot continuous molding was performed at a molding temperature of 230° C. and at a mold temperature of 35° C. After the molding, the state of a deposit on the mold (mold deposit) was observed, and evaluated in accordance with the four criteria (⊚, ○. Δ, and ×) which show the order of generation of a mold deposit in a smaller amount toward generation of a mold deposit in a larger amount.

<pH and BET Specific Surface Area>

The pH in the present invention was measured in accordance with JIS K 5101-17-1. The BET specific surface area was measured in accordance with a $N_2$ adsorption method.

Examples 1 to 32 and Comparative Examples 1 to 7

(B) Zinc oxide, (C) a polyamide resin, (D) a hindered amine compound, and (E) a carbodiimide compound, an oxazoline compound, or an epoxy compound were added in the formulation shown in Tables 1 to 3 to 100 parts by mass [phr] of (A) a polyacetal resin, and the resultant mixture was melt-kneaded using a twin-screw extruder at 210 to 230° C. under a reduced pressure of 21.3 kPa. The obtained pellets were evaluated in accordance with the above-mentioned methods for evaluation. The reference characters and numerals shown in Tables 1 to 3 are as described below. Further, the physical properties of zinc oxide (B) are shown in Table 4.

A-1: Polyacetal resin containing 0.8% by mass of oxyethylene units

A-2: Polyacetal resin containing 2.5% by mass of oxyethylene units

A-3: Polyacetal resin containing 7.7% by mass of oxyethylene units

A-4: Polyacetal resin containing 12.0% by mass of oxyethylene units

A-5: Polyacetal resin containing 0.05% by mass of oxyethylene units

B-1: JIS standard 1 type B (manufactured by Hakusuitech Co., Ltd.); particle diameter 2.8 μm B-2: ZINCOX SUPER F-3 (manufactured by Hakusuitech Co., Ltd.); particle diameter: 20 μm B-3: Finnex-30 (manufactured by Sakai Chemical Industry Co., Ltd.); particle diameter: 35 μm B-4: Zinca20 (manufactured by Sakai Chemical Industry Co., Ltd.); particle diameter: 20 μm B-5: Active zinc white (manufactured by Hakusuitech Co., Ltd.); particle diameter: 12 μm C: Amino group-terminal, polymerized fatty acid polyamide resin TXM-78C (manufactured by T&K TOKA Corporation); amine value (mg KOH/g): 9.2; softening temperature: 84° C.

D-1: Bis(2,2,6,6-tetramethyl-4-piperidyl) sebacate (Tinuvin (registered trademark) 770 (manufactured by BASF AG); molecular weight: 481)

D-2: Polycondensation product of dimethyl succinate and 4-hydroxy-2,2,6,6-tetramethyl-1-piperidineethanol (Tinuvin (registered trademark) 622 (manufactured by BASF AG); molecular weight: 6,600)

E-1: Aromatic polycarbodiimide (Stabaxol (registered trademark) P (manufactured by Rhein Chemie))

E-2: Oxazoline group-containing polymer (EPOCROS (registered trademark) RPS-1005 (manufactured by Nippon Shokubai Co., Ltd.))

E-3: Epoxy group-containing acrylic polymer (MARPROOF (registered trademark) G-1100 (manufactured by NOF Corporation))

TABLE 1

| | (A) | | (B) | | | (C) | (D) | | (E) | | Weight loss on heating [%] | Weight loss after immersed in fuel [%] | MD |
|---|---|---|---|---|---|---|---|---|---|---|---|---|---|
| | Type | Amount [phr] | Type | BET Specific surface area [m2/g] | Amount [phr] | Total surface area*1 [m2] | Amount [phr] | Type | Amount [phr] | Type | Amount [phr] | | | |
| Example 1 | A-1 | 100 | B-1 | 3 | 0.5 | 1.5 | — | — | — | — | — | 0.7 | 17.0 | Δ |
| Example 2 | A-1 | 100 | B-1 | 3 | 1.0 | 3.0 | — | — | — | — | — | 0.8 | 17.5 | Δ |
| Example 3 | A-1 | 100 | B-1 | 3 | 1.5 | 4.5 | — | — | — | — | — | 0.8 | 16.0 | ◯ |
| Example 4 | A-1 | 100 | B-1 | 3 | 1.83 | 5.5 | — | — | — | — | — | 0.9 | 15.0 | ◯ |
| Example 5 | A-1 | 100 | B-1 | 3 | 1.83 | 5.5 | 0.3 | — | — | — | — | 0.5 | 7.8 | ◯ |
| Example 6 | A-1 | 100 | B-1 | 3 | 1.83 | 5.5 | 0.5 | — | — | — | — | 0.4 | 7.8 | Δ |
| Example 7 | A-1 | 100 | B-1 | 3 | 1.83 | 5.5 | — | D-1 | 0.35 | — | — | 0.7 | 11.0 | ◯ |
| Example 8 | A-1 | 100 | B-1 | 3 | 1.83 | 5.5 | — | D-1 | 0.15 | — | — | 0.8 | 14.0 | ◯ |
| Example 9 | A-1 | 100 | B-1 | 3 | 1.83 | 5.5 | — | — | — | E-1 | 0.2 | 0.7 | 9.8 | ◎ |
| Example 10 | A-1 | 100 | B-1 | 3 | 1.83 | 5.5 | — | — | — | E-2 | 0.2 | 0.8 | 10.3 | ◎ |
| Example 11 | A-1 | 100 | B-1 | 3 | 1.83 | 5.5 | — | — | — | E-3 | 0.2 | 0.8 | 10.4 | ◎ |
| Example 12 | A-1 | 100 | B-1 | 3 | 1.83 | 5.5 | 0.3 | D-1 | 0.35 | — | — | 0.5 | 4.7 | ◯ |
| Example 13 | A-1 | 100 | B-1 | 3 | 1.83 | 5.5 | 0.3 | D-2 | 0.35 | — | — | 0.6 | 5.8 | Δ |
| Example 14 | A-1 | 100 | B-1 | 3 | 1.83 | 5.5 | 0.3 | — | — | E-1 | 0.2 | 0.5 | 7.2 | ◎ |
| Example 15 | A-1 | 100 | B-1 | 3 | 1.83 | 5.5 | 0.3 | — | — | E-2 | 0.2 | 0.6 | 7.4 | ◎ |
| Example 16 | A-1 | 100 | B-1 | 3 | 1.83 | 5.5 | 0.3 | — | — | E-3 | 0.2 | 0.6 | 7.4 | ◎ |
| Example 17 | A-1 | 100 | B-1 | 3 | 1.83 | 5.5 | 0.3 | D-1 | 0.35 | E-1 | 0.2 | 0.4 | 7.2 | ◎ |
| Example 18 | A-1 | 100 | B-1 | 3 | 1.83 | 5.5 | 0.3 | D-1 | 0.35 | E-2 | 0.2 | 0.4 | 7.3 | ◎ |
| Example 19 | A-1 | 100 | B-1 | 3 | 1.83 | 5.5 | 0.3 | D-1 | 0.35 | E-3 | 0.2 | 0.4 | 7.5 | ◎ |
| Example 20 | A-1 | 100 | B-1 | 3 | 3.34 | 10.0 | — | — | — | — | — | 1.8 | 10.0 | ◯ |
| Example 21 | A-1 | 100 | B-1 | 3 | 6.68 | 20.0 | — | — | — | — | — | 2.5 | 6.0 | ◯ |
| Comparative Example 1 | A-1 | 100 | | | | | — | — | — | — | — | 0.7 | 39.5 | ◯ |
| Comparative Example 2 | A-1 | 100 | B-1 | 3 | 0.005 | 0.015 | — | — | — | — | — | 0.7 | 39.0 | ◯ |
| Comparative Example 3 | A-1 | 100 | B-1 | 3 | 15.0 | 45.0 | — | — | — | — | — | 4.0 | 3.0 | X |
| Comparative Example 4 | A-1 | 100 | | | | | 0.3 | — | — | — | — | 0.3 | 25.0 | Δ |

*1 Total surface area of zinc oxide (B) per 100 g of polyacetal resin (A)

TABLE 2

| | (A) | | (B) | | | (C) | (D) | | (E) | | Weight loss on heating [%] | Weight loss after immersed in fuel [%] | MD |
|---|---|---|---|---|---|---|---|---|---|---|---|---|---|
| | Type | Amount [phr] | Type | BET Specific surface area [m2/g] | Amount [phr] | Total surface area*1 [m2] | Amount [phr] | Type | Amount [phr] | Type | Amount [phr] | | | |
| Example 22 | A-1 | 100 | B-2 | 20 | 0.28 | 5.5 | — | — | — | — | — | 1.0 | 16.0 | ◯ |
| Example 23 | A-1 | 100 | B-2 | 20 | 0.28 | 5.5 | 0.3 | — | — | — | — | 0.5 | 9.0 | ◯ |
| Example 24 | A-1 | 100 | B-3 | 30 | 0.18 | 5.5 | — | — | — | — | — | 1.4 | 14.0 | ◯ |
| Example 25 | A-1 | 100 | B-3 | 30 | 0.18 | 5.5 | 0.3 | — | — | — | — | 1.1 | 12.5 | ◯ |
| Example 26 | A-1 | 100 | B-4 | 40 | 0.14 | 5.5 | — | — | — | — | — | 1.5 | 19.0 | ◯ |
| Example 27 | A-1 | 100 | B-4 | 40 | 0.14 | 5.5 | 0.3 | — | — | — | — | 1.1 | 11.0 | ◯ |
| Example 28 | A-1 | 100 | B-5 | 69 | 0.09 | 5.5 | — | — | — | — | — | 1.6 | 20.0 | ◯ |
| Example 29 | A-1 | 100 | B-5 | 69 | 0.08 | 5.5 | 0.3 | — | — | — | — | 1.2 | 12.5 | ◯ |
| Comparative Example 5 | A-1 | 100 | B-4 | 40 | 3.00 | 120.0 | — | — | — | — | — | 4.1 | 2.5 | X |
| Comparative Example 6 | A-1 | 100 | B-5 | 69 | 2.00 | 138.0 | — | — | — | — | — | 4.0 | 1.5 | X |

*1 Total surface area of zinc oxide (B) per 100 g of polyacetal resin (A)

| | (A) | | (B) | | | (C) | (D) | | (E) | | Weight loss on heating [%] | Weight loss after immersed in fuel [%] | MD |
|---|---|---|---|---|---|---|---|---|---|---|---|---|---|
| | Type | Amount [phr] | Type | BET Specific surface area [m2/g] | Amount [phr] | Total surface area*1 [m2] | Amount [phr] | Type | Amount [phr] | Type | Amount [phr] | | | |
| Example 4 | A-1 | 100 | B-1 | 3 | 1.83 | 5.5 | — | — | — | — | — | 0.9 | 15.0 | ○ |
| Example 30 | A-2 | 100 | B-1 | 3 | 1.83 | 5.5 | — | — | — | — | — | 0.9 | 15.4 | ○ |
| Example 31 | A-3 | 100 | B-1 | 3 | 1.83 | 5.5 | — | — | — | — | — | 1.1 | 17.2 | ○ |
| Example 32 | A-4 | 100 | B-1 | 3 | 1.83 | 5.5 | — | — | — | — | — | 1.5 | 21.1 | Δ |
| Comparative Example 7 | A-5 | 100 | B-1 | 3 | 1.83 | 5.5 | — | — | — | — | — | ※2 | | |

*1 Total surface area of zinc oxide (B) per 100 g of polyacetal resin (A)
※2 Sampling is impossible because of vigorous decomposition or foaming upon melt-kneading.

TABLE 4

| Zinc oxide (B) | BET Specific surface area (m²/g) | Particle diameter (μm) | pH |
|---|---|---|---|
| B-1 | 3 | 2.8 | 7.3 |
| B-2 | 20 | 20.0 | 7.5 |
| B-3 | 30 | 35.0 | 6.5 |
| B-4 | 40 | 20.0 | 9.2 |
| B-5 | 69 | 12.0 | 9.7 |

The invention claimed is:

1. A polyacetal resin composition comprising:
(A) a polyacetal resin and (B) zinc oxide, wherein the content of oxyalkylene constituent units other than an oxymethylene group in the polyacetal resin (A) is 0.1% by mass or more, wherein the total surface area of the zinc oxide (B) in the polyacetal resin composition is 0.1 to 40 m² per 100 g of the polyacetal resin (A), and wherein the zinc oxide (B) has a BET specific surface area of 0.1 to 9 m²/g, and wherein the polyacetal resin composition contains 0.01 to 3.0 parts by mass of (E) at least one compound selected from the group consisting of a carbodiimide compound and an oxazoline compound, relative to 100 parts by mass of the polyacetal resin (A).

2. The polyacetal resin composition according to claim 1, wherein the content of the oxyalkylene constituent units other than an oxymethylene group in the polyacetal resin (A) is 0.1% to 10.0% by mass.

3. The polyacetal resin composition according to claim 1, wherein the zinc oxide (B) has a pH of 6 to 8, as measured in accordance with JIS K 5101-17-1.

4. The polyacetal resin composition according to claim 1, wherein the polyacetal resin composition contains 0.01 to 3.0 parts by mass of (C) a polyamide resin, relative to 100 parts by mass of the polyacetal resin (A).

5. The polyacetal resin composition according to claim 1, wherein the polyacetal resin composition contains 0.01 to 3.0 parts by mass of (D) a hindered amine compound, relative to 100 parts by mass of the polyacetal resin (A).

* * * * *